(12) United States Patent
Shiramizu et al.

(10) Patent No.: US 11,221,046 B2
(45) Date of Patent: Jan. 11, 2022

(54) MANUFACTURING METHOD AND MANUFACTURING APPARATUS FOR WHEEL BEARING DEVICE

(71) Applicant: JTEKT CORPORATION, Osaka (JP)

(72) Inventors: Koki Shiramizu, Yamatotakada (JP); Nobuyuki Seo, Toyoake (JP)

(73) Assignee: JTEKT CORPORATION, Osaka (JP)

( * ) Notice: Subject to any disclaimer, the term of this patent is extended or adjusted under 35 U.S.C. 154(b) by 25 days.

(21) Appl. No.: 16/743,214

(22) Filed: Jan. 15, 2020

(65) Prior Publication Data
US 2020/0232510 A1 Jul. 23, 2020

(30) Foreign Application Priority Data

Jan. 23, 2019 (JP) .............................. JP2019-009527

(51) Int. Cl.
| | |
|---|---|
| *F16C 33/64* | (2006.01) |
| *F16C 33/60* | (2006.01) |
| *F16C 43/04* | (2006.01) |
| *B60B 27/00* | (2006.01) |
| *B21D 53/10* | (2006.01) |

(52) U.S. Cl.
CPC .............. *F16C 33/64* (2013.01); *B21D 53/10* (2013.01); *B60B 27/0078* (2013.01); *F16C 33/60* (2013.01); *F16C 43/04* (2013.01); *B60B 27/001* (2013.01); *B60B 27/0005* (2013.01); *B60B 2310/316* (2013.01); *B60B 2380/12* (2013.01); *B60B 2380/14* (2013.01); *F16C 2326/02* (2013.01)

(58) Field of Classification Search
CPC ........ B23P 15/003; F16C 33/64; F16C 43/04; F16C 2220/70; F16C 43/045
See application file for complete search history.

(56) References Cited

U.S. PATENT DOCUMENTS

| | | | |
|---|---|---|---|
| 2008/0199121 A1* | 8/2008 | Komori | ............... B60B 27/0005 384/490 |
| 2013/0051720 A1 | 2/2013 | Komori et al. | |
| 2017/0198749 A1* | 7/2017 | Seo | ........................ F16C 19/181 |

FOREIGN PATENT DOCUMENTS

JP 2011-196455 A 10/2011

\* cited by examiner

*Primary Examiner* — Christopher J Besler
(74) *Attorney, Agent, or Firm* — Oliff PLC

(57) ABSTRACT

A manufacturing method of a wheel bearing device, the wheel bearing device including an outer ring member, an inner shaft member that includes a shaft portion that has an inside raceway and a flange portion, a plurality of rolling elements, a seal provided at an end portion of the outer ring member on the first axial side and including an axial lip, and a lip contact surface provided on the side of the inner shaft member and contacted by the axial lip, includes: processing the outside raceway with a distance in an axial direction from a first reference position being managed, a first reference position being set on the outer ring member; and providing the seal at a predetermined position, in the axial direction, of the outer ring member with respect to the first reference position.

3 Claims, 7 Drawing Sheets

FIG. 1

FIRST AXIAL SIDE
(VEHICLE OUTER SIDE)

SECOND AXIAL SIDE
(VEHICLE INNER SIDE)

MANUFACTURING METHOD AND MANUFACTURING APPARATUS FOR WHEEL BEARING DEVICE

CROSS-REFERENCE TO RELATED APPLICATION

This application claims priority to Japanese Patent Application No. 2019-009527 filed on Jan. 23, 2019, incorporated herein by reference in its entirety.

BACKGROUND

1. Technical Field

The present disclosure relates to a manufacturing method and a manufacturing apparatus for a wheel bearing device.

2. Description of Related Art

A hub unit (wheel bearing device) mounted on a vehicle such as an automobile to rotatably support a wheel includes an inner shaft member and an outer ring member disposed concentrically with each other. The inner shaft member is provided so as to be rotatable with respect to the outer ring member by rolling elements disposed between the inner shaft member and the outer ring member. A flange portion that extends outward in the radial direction is provided at an end portion of the inner shaft member on the vehicle outer side. The wheel and a brake disc are attached to the flange portion. In such a hub unit, a sealing device is mounted to both end portions, in the axial direction, of an annular space between the inner shaft member and the outer ring member, in which the rolling elements are disposed, in order to prevent entry of muddy water etc. into the annular space from an external space (see Japanese Unexamined Patent Application Publication No. 2011-196455 (JP 2011-196455 A)).

Figure 7:
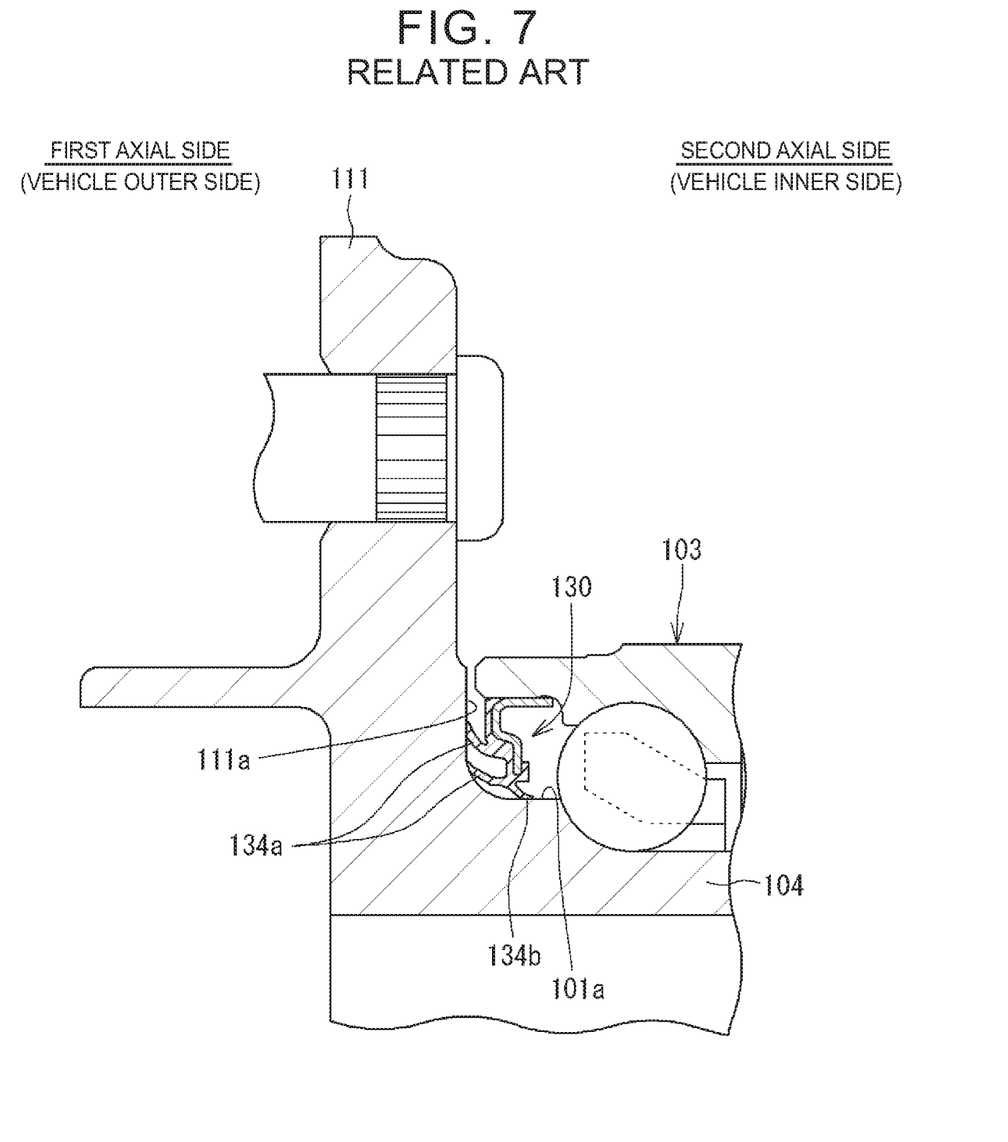
FIG. 7 is a sectional view illustrating a sealing device of a wheel bearing device according to the related art.

An example of the sealing device which is used on the vehicle outer side in the hub unit is illustrated in FIG. 7. This sealing device includes a seal 130 attached to an outer ring member 103. The seal 130 includes axial lips 134a and a radial lip 134b. The respective distal ends of the lips contact an outer peripheral surface 101a of an inner shaft member 104 and a side surface 111a of a flange portion 111 on the vehicle inner side (hereinafter such surfaces will be referred to also as "lip contact surfaces").

SUMMARY

In order to improve the sealing performance of the seal, it is effective to enhance the pressure of contact of the lip with the lip contact surface by increasing the interference of the lip with respect to the lip contact surface. If the interference of the lip is too large, however, the resistance against rotation of the inner shaft member is disadvantageously large. Therefore, it is desired that the interference of the lip of the seal is set to an appropriate value in consideration of both the sealing performance and the resistance against rotation of the inner shaft member.

However, the interference of the axial lip tends to be varied by being affected by the position of attachment of the seal with respect to the outer ring member in the axial direction or the position of the lip contact surface contacted by the axial lip in the axial direction, and it is difficult to cause the axial lip to contact the lip contact surface with an appropriate interference. Therefore, it is necessary to accurately position the seal and/or the lip contact surface in the axial direction.

The present disclosure provides a manufacturing method and a manufacturing apparatus for a wheel bearing device, in which an axial lip of a seal can contact a lip contact surface with an appropriate interference in a sealing device on a first axial side disposed on the vehicle outer side.

A first aspect of the present disclosure provides a manufacturing method of a wheel bearing device, the wheel bearing device including an outer ring member that has an outside raceway at an inner periphery, an inner shaft member that includes a shaft portion disposed inward of the outer ring member in a radial direction and having an inside raceway that faces the outside raceway, and a flange portion disposed closer to a first axial side than the outer ring member is, and that projects outward in the radial direction from the shaft portion, a plurality of rolling elements disposed between the outside raceway and the inside raceway, a seal provided at an end portion of the outer ring member on the first axial side and including an axial lip, and a lip contact surface provided on a side of the inner shaft member and contacted by the axial lip, the manufacturing method including: processing the outside raceway with a distance in an axial direction from a first reference position being managed, the first reference position being set on the outer ring member; and providing the seal at a predetermined position, in the axial direction, of the outer ring member with respect to the first reference position.

With the manufacturing method described above, the rolling elements which are disposed on the outside raceway and the seal are positioned in a predetermined relationship in the axial direction. Meanwhile, the rolling elements on the outside raceway are also disposed on the inside raceway of the inner shaft member, and thus the seal and the inner shaft member are also positioned in a predetermined relationship in the axial direction. Therefore, the axial lip of the seal can be caused to contact the lip contact surface on the side of the inner shaft member with as appropriate an interference as possible.

In the above aspect, the manufacturing method may further include: processing the inside raceway with a distance in the axial direction from a second reference position being managed, the second reference position being set on the inner shaft member; and providing the lip contact surface at a predetermined position, in the axial direction, of the inner shaft member with respect to the second reference position. With the manufacturing method described above, the rolling elements which are disposed on the inside raceway and the lip contact surface are positioned in a predetermined relationship in the axial direction. Therefore, the lip contact surface and the seal are also positioned in a predetermined relationship in the axial direction, and the axial lip of the seal can be caused to contact the lip contact surface with a more appropriate interference.

A second aspect of the present disclosure provides a manufacturing method of a wheel bearing device, the wheel bearing device including an outer ring member that has an outside raceway at an inner periphery, an inner shaft member that includes a shaft portion disposed inward of the outer ring member in a radial direction and having an inside raceway that faces the outside raceway, and a flange portion disposed closer to a first axial side than the outer ring member is, and that projects outward in the radial direction from the shaft portion, a plurality of rolling elements disposed between the outside raceway and the inside raceway, a seal provided at an end portion of the outer ring member on the first axial side and including an axial lip, and a lip contact surface provided on a side of the inner shaft member and contacted by the axial lip, the manufacturing method including: processing the inside raceway with a distance in an axial direction from a second reference position being managed, the second reference position being set on the inner shaft member; and providing the lip contact surface at a predetermined position, in the axial direction, of the inner shaft member with respect to the second reference position.

With the manufacturing method described above, the rolling elements which are disposed on the inside raceway and the lip contact surface are positioned in a predetermined relationship in the axial direction. Meanwhile, the rolling elements on the inside raceway are also disposed on the outside raceway of the outer ring member, and thus the lip contact surface and the outer ring member are also positioned in a predetermined relationship in the axial direction. Therefore, the axial lip of the seal which is provided on the side of the outer ring member can be caused to contact the lip contact surface with as appropriate an interference as possible.

In the above aspect, the first reference position may be an end surface of the outer ring member on the first axial side. With the configuration described above, the first reference position is set in the vicinity of the seal, and the seal can be easily provided at an end portion of the outer ring member with respect to the first reference position.

In the above aspect, the second reference position may be a side surface of the flange portion on a second axial side. With the configuration described above, the second reference position is set in the vicinity of the lip contact surface, and the lip contact surface can be easily provided on the side of the inner shaft member with respect to the second reference position.

In the above aspect, a slinger may be provided on an outer peripheral surface of the shaft portion, the slinger being disposed with a predetermined spacing on a second axial side from the second reference position, and the lip contact surface may be provided on a surface of the slinger on the second axial side. With the configuration described above, the lip contact surface can be provided at an appropriate position with respect to the second reference position also in the case where the lip contact surface is provided on the slinger which is disposed with a spacing on the second axial side from the second reference position.

A third aspect of the present disclosure provides a manufacturing apparatus for a wheel bearing device, the wheel bearing device including an outer ring member that has an outside raceway at an inner periphery, an inner shaft member that includes a shaft portion disposed inward of the outer ring member in a radial direction and having an inside raceway that faces the outside raceway, and a flange portion disposed closer to a first axial side than the outer ring member is, and that projects outward in the radial direction from the shaft portion, a plurality of rolling elements disposed between the outside raceway and the inside raceway, a seal provided at an end portion of the outer ring member on the first axial side and including an axial lip, and a lip contact surface provided on a side of the inner shaft member and contacted by the axial lip, the manufacturing apparatus including: a first processing tool that processes the outside raceway with a distance in an axial direction from a first reference position being managed, the first reference position being set on the outer ring member; and a press fitting jig that press-fits the seal at a predetermined position, in the axial direction, of the outer ring member with respect to the first reference position.

With the manufacturing apparatus described above, the rolling elements which are disposed on the outside raceway and the seal are positioned in a predetermined relationship in the axial direction. Meanwhile, the rolling elements on the outside raceway are also disposed on the inside raceway of the inner shaft member, and thus the seal and the inner shaft member are also positioned in a predetermined relationship in the axial direction. Therefore, the axial lip of the seal can be caused to contact the lip contact surface, which is provided on the side of the inner shaft member, with as appropriate an interference as possible.

In the above aspect, the manufacturing apparatus may further include: a second processing tool that processes the inside raceway with a distance in the axial direction from a second reference position being managed, the second reference position being set on the inner shaft member; and a second press fitting jig that press-fits a slinger that includes the lip contact surface at a predetermined position, in the axial direction, of the inner shaft member with respect to the second reference position. With the manufacturing apparatus described above, the rolling elements which are disposed on the inside raceway and the lip contact surface are positioned in a predetermined relationship in the axial direction. Therefore, the lip contact surface and the seal are also positioned in a predetermined relationship in the axial direction, and the axial lip of the seal can be caused to contact the lip contact surface with a more appropriate interference.

A fourth aspect of the present disclosure provides a manufacturing apparatus for a wheel bearing device, the wheel bearing device including an outer ring member that has an outside raceway at an inner periphery, an inner shaft member that includes a shaft portion disposed inward of the outer ring member in a radial direction and having an inside raceway that faces the outside raceway, and a flange portion disposed closer to a first axial side than the outer ring member is, and that projects outward in the radial direction from the shaft portion, a plurality of rolling elements disposed between the outside raceway and the inside raceway, a seal provided at an end portion of the outer ring member on the first axial side and including an axial lip, and a lip contact surface provided on a side of the inner shaft member and contacted by the axial lip, the manufacturing apparatus including: a second processing tool that processes the inside raceway with a distance in an axial direction from a second reference position being managed, the second reference position being set on the inner shaft member; and a second press fitting jig that press-fits a slinger that includes the lip contact surface at a predetermined position, in the axial direction, of the inner shaft member with respect to the second reference position.

With the manufacturing apparatus described above, the rolling elements which are disposed on the inside raceway and the lip contact surface are positioned in a predetermined relationship in the axial direction. Meanwhile, the rolling elements on the inside raceway are also disposed on the outside raceway of the outer ring member, and thus the lip contact surface and the outer ring member are also positioned in a predetermined relationship in the axial direction. Therefore, the axial lip of the seal which is provided on the side of the outer ring member can be caused to contact the lip contact surface with as appropriate an interference as possible.

With the above aspects, the interference of the axial lip of the seal with respect to the lip contact surface can be set appropriately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
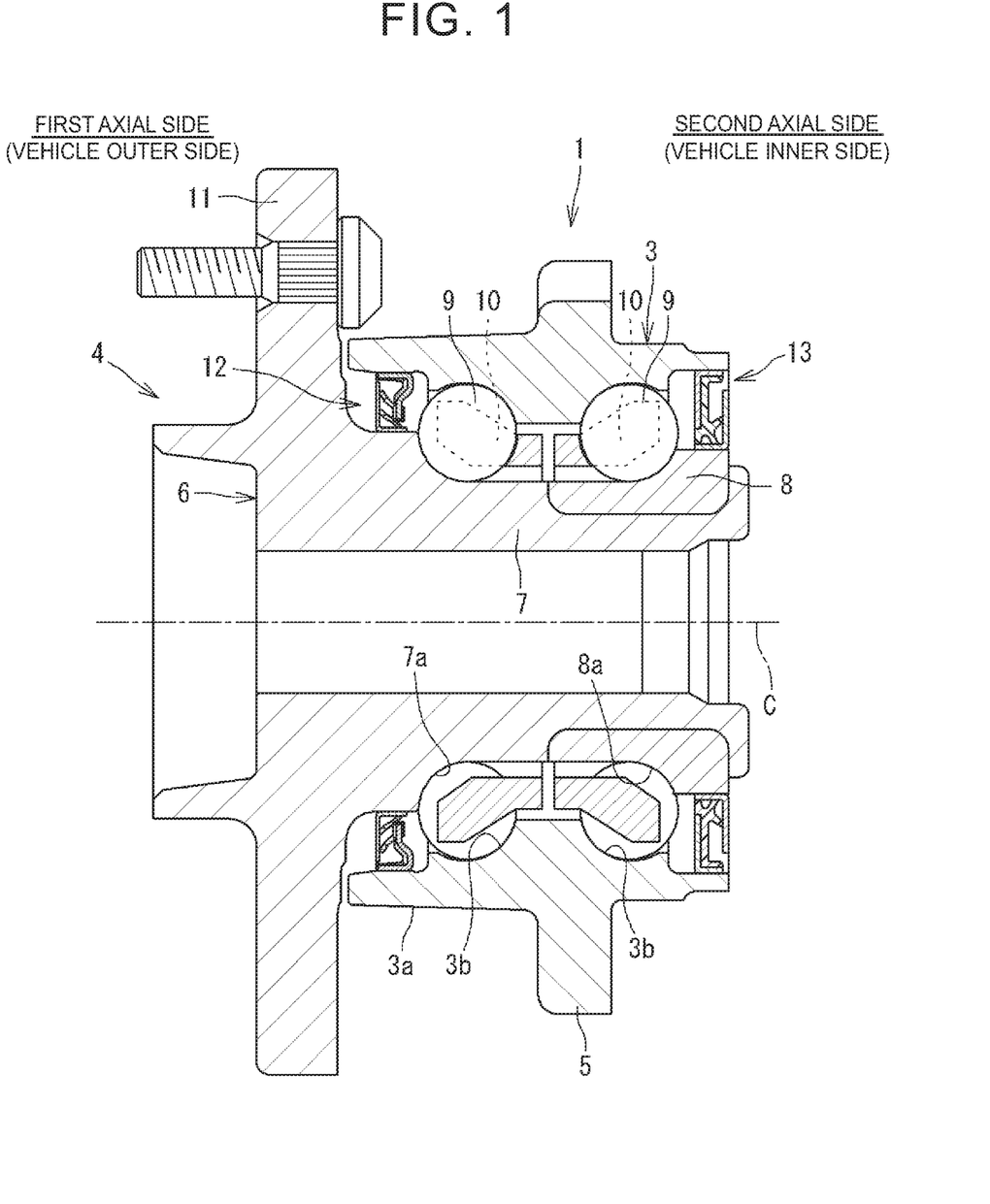
FIG. 1 is a sectional view of a wheel bearing device according to an embodiment of the present disclosure.

An embodiment of the present disclosure will be described below with reference to the attached drawings.
Configuration of Wheel Bearing Device FIG. 1 is a sectional view of a wheel bearing device according to an embodiment of the present disclosure. A wheel bearing device (hub unit) 1 according to the present embodiment supports a wheel so as to be rotatable with respect to a suspension device provided to a body of a vehicle. The wheel bearing device 1 includes an outer ring member 3, an inner shaft member (hub shaft) 4, rolling elements 9, and a cage 10. In the following description, the direction (right-left direction in FIG. 1) which is parallel to a central axis C of the wheel bearing device 1 is referred to as an "axial direction", and the direction which is orthogonal to the axial direction is referred to as a "radial direction". With the wheel bearing device 1 provided to the body of the vehicle, the left side in FIG. 1 which corresponds to the vehicle outer side is referred to as a "first axial side", and the right side in FIG. 1 which corresponds to the vehicle inner side is referred to as a "second axial side".

The outer ring member 3 and the inner shaft member 4 are disposed concentrically with each other. In the present embodiment, the inner shaft member 4 is rotatable about the central axis C with respect to the outer ring member 3. The wheel bearing device 1 can support the inner shaft member 4, which includes a flange portion 11 to which a wheel and a brake disc (not illustrated) are fixed, so as to be rotatable with respect to the vehicle body.

The outer ring member 3 is made of carbon steel for machine structural use etc. The outer ring member 3 is formed in a cylindrical shape, and includes a flange 5 on an outer peripheral surface 3a. The flange 5 is fixed to the suspension device on the side of the vehicle body by a bolt. The inner peripheral surface of the outer ring member 3 is provided with double-row outside raceways 3b.

The inner shaft member 4 includes an inner shaft 6 and an inner ring 8. The inner shaft 6 is made of carbon steel for machine structural use. The inner ring 8 is made of high-carbon chromium bearing steel. The inner shaft 6 includes a body portion 7 that extends along the axial direction and a flange portion 11 that projects outward in the radial direction from the body portion 7. The body portion 7 and the flange portion 11 are formed integrally with each other. The flange portion 11 is provided on the first axial side of the body portion 7. The wheel and the brake disc (not illustrated) are attached to the flange portion 11.

The inner ring 8 is formed in an annular shape, externally fitted with an end portion of the inner shaft 6 on the second axial side, and fixed by clinching. The body portion 7 of the inner shaft 6 and the inner ring 8 constitute the shaft portion according to the present disclosure which is disposed inward of the outer ring member in the radial direction. The flange portion 11 of the inner shaft 6 constitutes the flange portion according to the present disclosure which is disposed closer to the first axial side than the outer ring member 3.

The outer peripheral surface of the body portion 7 is provided with an inside raceway 7a that faces the inner side, in the radial direction, of the outside raceway 3b on the first axial side. The outer peripheral surface of the inner ring 8 is provided with an inside raceway 8a that faces the inner side, in the radial direction, of the outside raceway 3b on the second axial side. A plurality of rolling elements 9 are disposed between the double-row outside raceways 3b and inside raceways 7a and 8a. In the present embodiment, the rolling elements 9 are balls. The plurality of balls 9 on the raceways are held by the cage 10 with a predetermined spacing therebetween in the circumferential direction. The outside raceways 3b and the inside raceways 7a and 8a are each formed in a concave arcuate shape in cross section. The balls 9 make point contact with the outside raceways 3b and the inside raceways 7a and 8a with a contact angle.

Sealing devices 12 and 13 are attached between both end portions, in the axial direction, of the outer ring member 3 and the inner shaft member 4, more particularly between an end portion of the outer ring member 3 on the first axial side and the body portion 7 and between an end portion of the outer ring member 3 on the second axial side and the inner ring 8. The sealing devices 12 and 13 have a role of preventing entry of foreign matter such as muddy water into an annular space formed between the outer ring member 3 and the inner shaft member 4, and sealing the annular space so that a lubricant in the annular space does not leak out.

Figure 2:
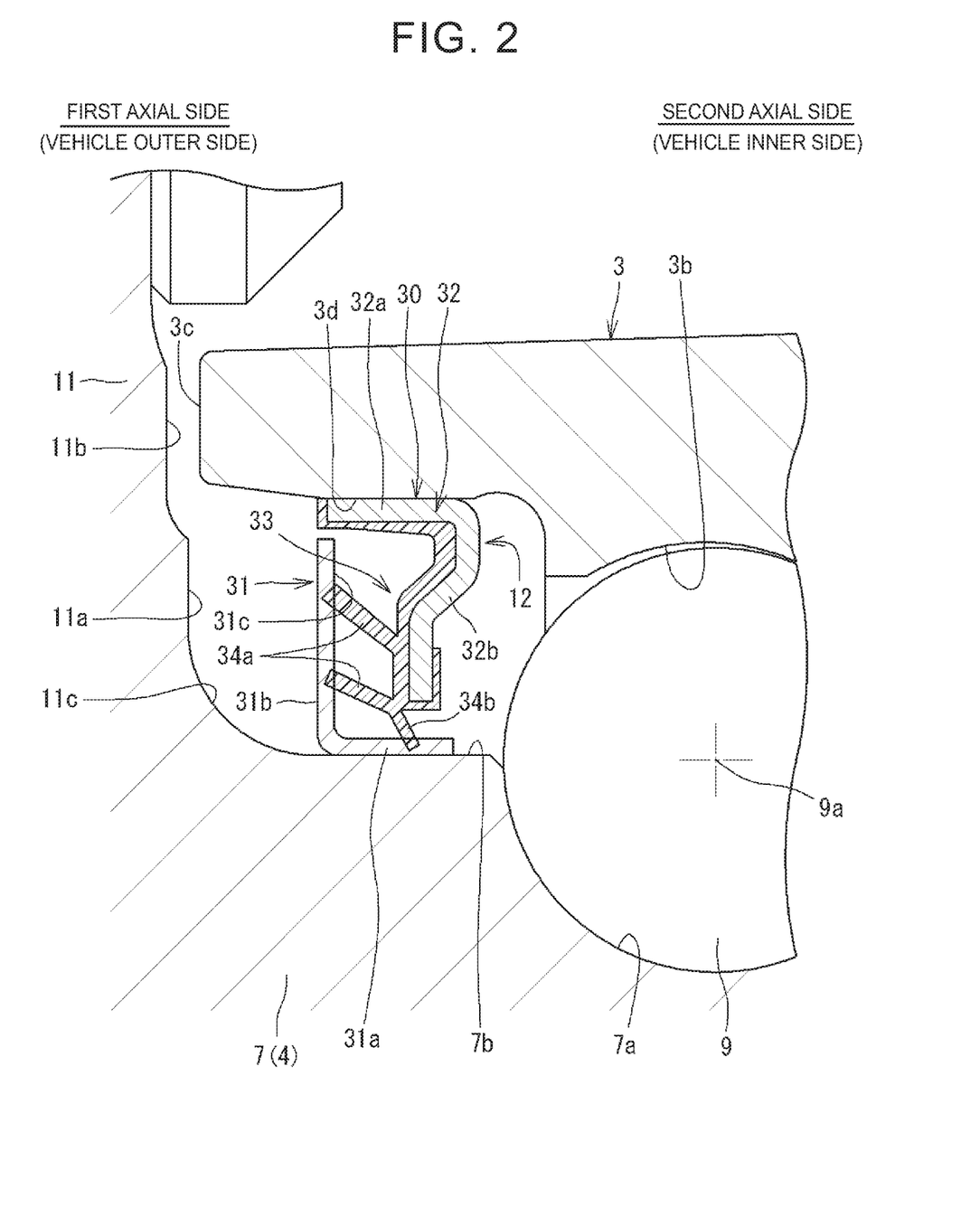
FIG. 2 is an enlarged sectional view of a sealing device.

FIG. 2 is an enlarged sectional view of the sealing device 12. As illustrated in FIG. 2, the sealing device 12 which is disposed on the first axial side includes a seal 30 and a slinger 31. The slinger 31 is formed in an annular shape by pressing a sheet of metal such as stainless steel which is a hard material that is not easily rusted.

The slinger 31 includes a cylindrical portion 31a and a circular ring portion 31b. The cylindrical portion 31a is formed in a cylindrical shape, and fitted with an outer peripheral surface 7b of the body portion 7 of the inner shaft member 4 to be fixed to the body portion 7.

The circular ring portion 31b is formed in a circular ring shape, and extends outward in the radial direction from an end portion of the cylindrical portion 31a on the first axial side (outer side in the axial direction). The circular ring portion 31b is disposed with a spacing from a side surface 11a of the flange portion 11 on the second axial side (inner side in the axial direction). The circular ring portion 31b is disposed closer to the second axial side than an end surface 3c of the outer ring member 3 on the first axial side. The side surface 11a of the flange portion 11 on the second axial side is continuous with the outer peripheral surface 7b of the body portion 7 via a curved surface 11c in an arcuate shape. In the present embodiment, a side surface 11b is provided outward of the side surface 11a of the flange portion 11 in the radial direction. The side surface 11b is positioned on the first axial side with respect to the side surface 11a via a stepped portion. It should be noted, however, that the side surfaces 11a and 11b may be flush with each other.

The seal 30 includes a metal ring 32 and an elastic member 33. The metal ring 32 is formed in an annular shape by pressing a sheet of steel such as a cold-rolled steel plate (defined as SPCC in Japanese Industrial Standards). The metal ring 32 is fixed to the outer ring member 3. The metal ring 32 includes a cylindrical portion 32a and a circular ring portion 32b. The cylindrical portion 32a is formed in a cylindrical shape, and fitted with an inner peripheral surface 3d of an end portion of the outer ring member 3 on the first axial side. The circular ring portion 32b is formed in a circular ring shape, and extends inward in the radial direction from an end portion of the cylindrical portion 32a on the second axial side (inner side in the axial direction).

The elastic member 33 is formed in an annular shape from nitrile rubber etc. The elastic member 33 is bonded to the metal ring 32 through vulcanization. The elastic member 33 includes a plurality of lips 34a and 34b. The plurality of lips 34a and 34b include axial lips 34a and a radial lip 34b.

The axial lips 34a extend from the circular ring portion 32b of the metal ring 32 toward the first axial side. The lip distal ends of the axial lips 34a contact a side surface 31c of the circular ring portion 31b of the slinger 31 on the second axial side with a predetermined interference. Thus, the side surface 31c of the circular ring portion 31b of the slinger 31 on the second axial side serves as a lip contact surface contacted by the axial lips 34a. The interference of the axial lip 34a is defined as the distance in the axial direction between the position of the lip distal end of the axial lip 34a in a state in which the lip distal end does not contact the lip contact surface 31c and no external force acts on the axial lip 34a and the position of the lip distal end of the axial lip 34a in a desired state in which the lip distal end contacts the lip contact surface 31c and the annular space is defined from an external space.

The radial lip 34b extends inward in the radial direction from an inner end portion, in the radial direction, of the circular ring portion 32b of the metal ring 32. The lip distal end of the radial lip 34b contacts the outer peripheral surface of the cylindrical portion 31a of the slinger 31.

Figure 3:
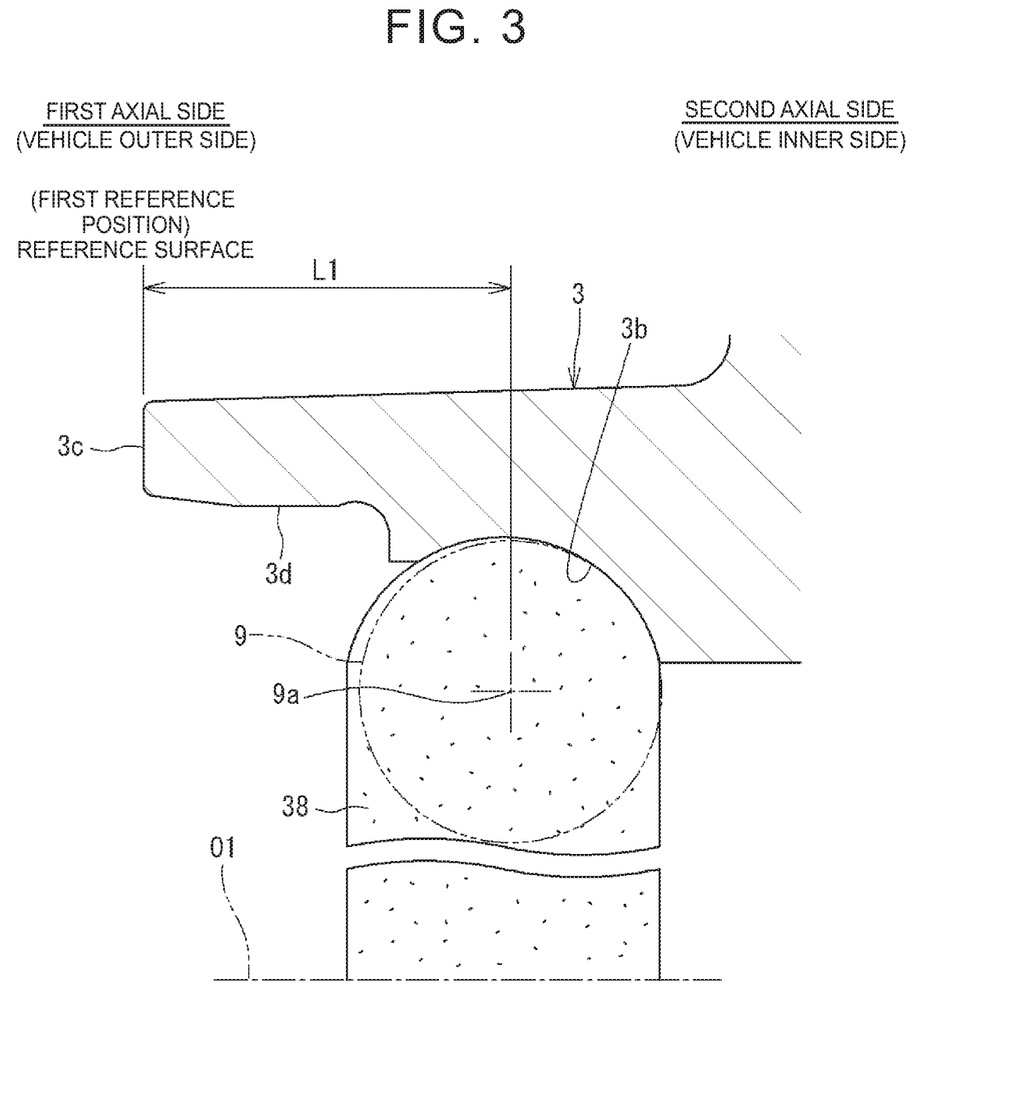
FIG. 3 is a sectional view illustrating a step of processing an outside raceway in an outer ring member.

A step of processing the outside raceway 3b in a manufacturing method of the wheel bearing device 1 will be described. FIG. 3 is a sectional view illustrating a step of processing the outside raceway 3b of the outer ring member 3. The outside raceway 3b of the outer ring member 3 is polished or ground by a grindstone (first processing tool) 38 for finishing to be processed into the final shape as the product. The grindstone 38 is rotated about a central axis O1 which is parallel to the central axis C (see FIG. 1) of the outer ring member 3.

In the present embodiment, as discussed later, the end surface 3c of the outer ring member 3 on the first axial side corresponds to a reference surface (first reference position) for determining the position of the seal 30 in the axial direction. The processing position, in the axial direction, of the grindstone 38 is determined using the reference surface 3c as the reference (origin). The grindstone 38 is moved to the processing position, and processes the outside raceway 3b. Thus, the surface shape of the outside raceway 3b is processed with the distance, in the axial direction, from the reference surface 3c managed, or in other words at a position a predetermined distance away from the reference surface 3c. In FIG. 3, the center of the ball 9 which rolls on the outside raceway 3b in the case where the wheel bearing device 1 is assembled is denoted by reference symbol 9a. Since the distance from the reference surface 3c to the outside raceway 3b is set to a predetermined value by the grindstone 38, a distance L1 between the reference surface 3c and the center 9a of the ball 9 on the outside raceway 3b is also set to a predetermined dimension.

Figure 4:
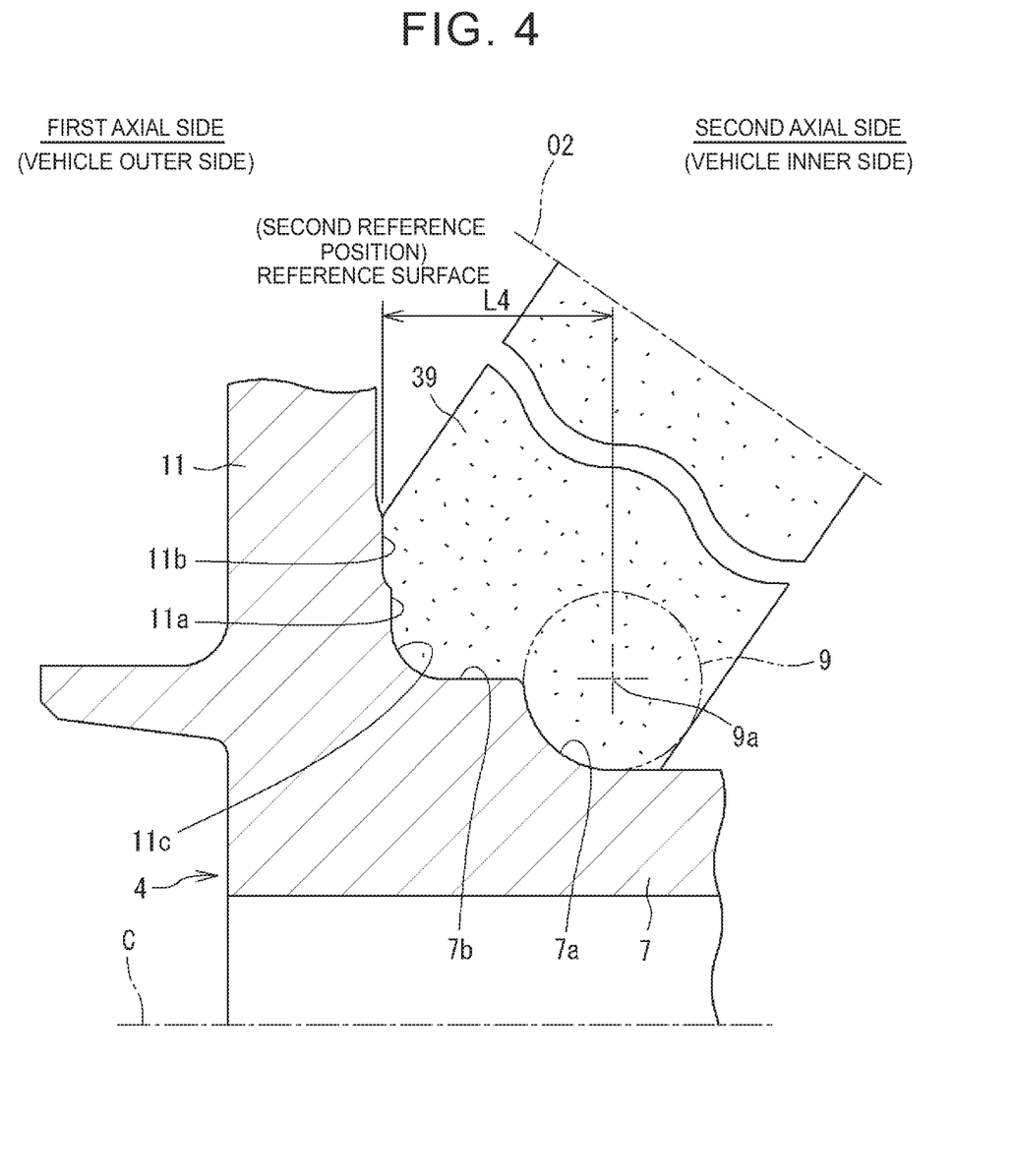
FIG. 4 is a sectional view illustrating a step of processing an inside raceway in an inner shaft member.

A step of processing the inside raceway 7a will be described. FIG. 4 is a sectional view illustrating a step of processing the inside raceway 7a of the inner shaft member 4. The inside raceway 7a of the body portion 7 of the inner shaft member 4, the outer peripheral surface 7b of the body portion 7, and the side surfaces 11a and 11b and the curved surface 11c on the second axial side of the inner portion (root portion), in the radial direction, of the flange portion 11 are polished or ground by a grindstone (second processing tool) 39 for finishing to be processed into the final shape as the product. The grindstone 39 is rotated about a central axis O2 which is inclined with respect to the central axis C of the inner shaft member 4.

In the present embodiment, as discussed later, the side surface 11b of the flange portion 11 on the second axial side corresponds to a reference surface (second reference position) for determining the position of the slinger 31 in the axial direction. The reference surface 11b and the inside raceway 7a are polished using the same grindstone 39. Therefore, the surface shape of the inside raceway 7a is processed with the distance, in the axial direction, from the reference surface 11b managed, or in other words with the spacing in the axial direction from the reference surface 11b kept constant. Since the distance in the axial direction from the reference surface 11b to the inside raceway 7a is set to a predetermined value by the grindstone 39, a distance L4 in the axial direction between the reference surface 11b and the center 9a of the ball 9 on the inside raceway 7a is also set to a predetermined dimension.

Figure 5:
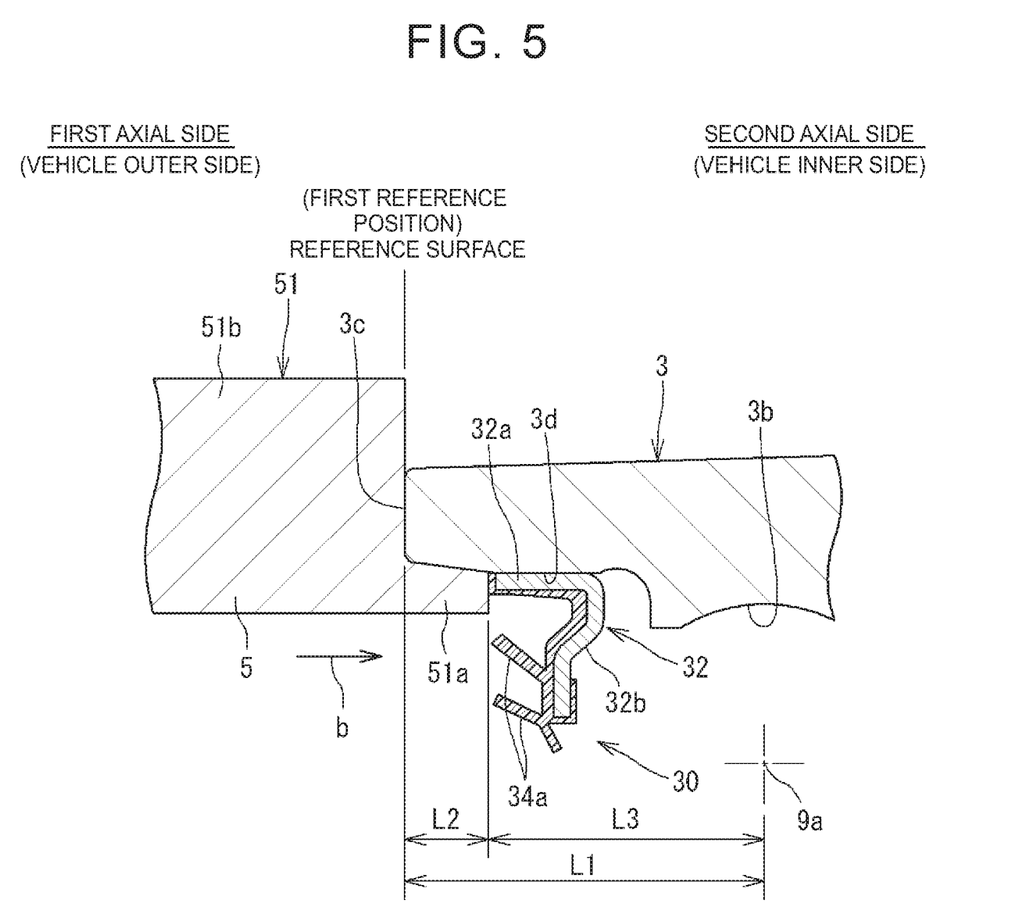
FIG. 5 is a sectional view illustrating a step of attaching a seal to the outer ring member.

A step of attaching the seal 30 will be described. FIG. 5 is a sectional view illustrating a step of attaching the seal 30 to the outer ring member 3. As illustrated in FIG. 5, the seal 30 is press-fitted with the inner peripheral surface 3d of an end portion of the outer ring member 3 on the first axial side using a press fitting jig (first press fitting jig) 51. The press fitting jig 51 is movable in the axial direction by a drive mechanism (not illustrated). The press fitting jig 51 includes a pressing portion 51a and a positioning portion 51b. The pressing portion 51a contacts a side surface of the seal 30 on the first axial side. The positioning portion 51b is disposed on the first axial side of the pressing portion 51a, and projects to a position outward of the pressing portion 51a in the radial direction. The distance between an end surface of the pressing portion 51a on the second axial side and an end surface of the positioning portion 51b on the second axial side coincides with a design dimension L2 between the end surface 3c of the outer ring member 3 on the first axial side, which serves as the reference surface, and a side surface of the seal 30 on the first axial side.

The cylindrical portion 32a of the seal 30 is press-fitted with the inner peripheral surface 3d of the outer ring member 3 using the press fitting jig 51. In this event, an end portion of the cylindrical portion 32a on the second axial side is positioned at an end portion of the inner peripheral surface 3d on the first axial side, and an end portion of the seal 30 on the first axial side is pressed in the direction of the arrow b by the pressing portion 51a. An end surface of the positioning portion 51b on the second axial side is caused to contact the reference surface 3c. Consequently, the seal 30 is attached at an appropriate position in the axial direction.

As discussed earlier, the distance L1 from the reference surface 3c to the center 9a of the ball 9 on the outside raceway 3b is a predetermined dimension achieved by finishing using the grindstone 38 illustrated in FIG. 3. Therefore, when the wheel bearing device 1 is assembled, a distance L3 between an end surface of the seal 30 on the first axial side and the center 9a of the ball 9 is also a predetermined dimension.

Figure 6:
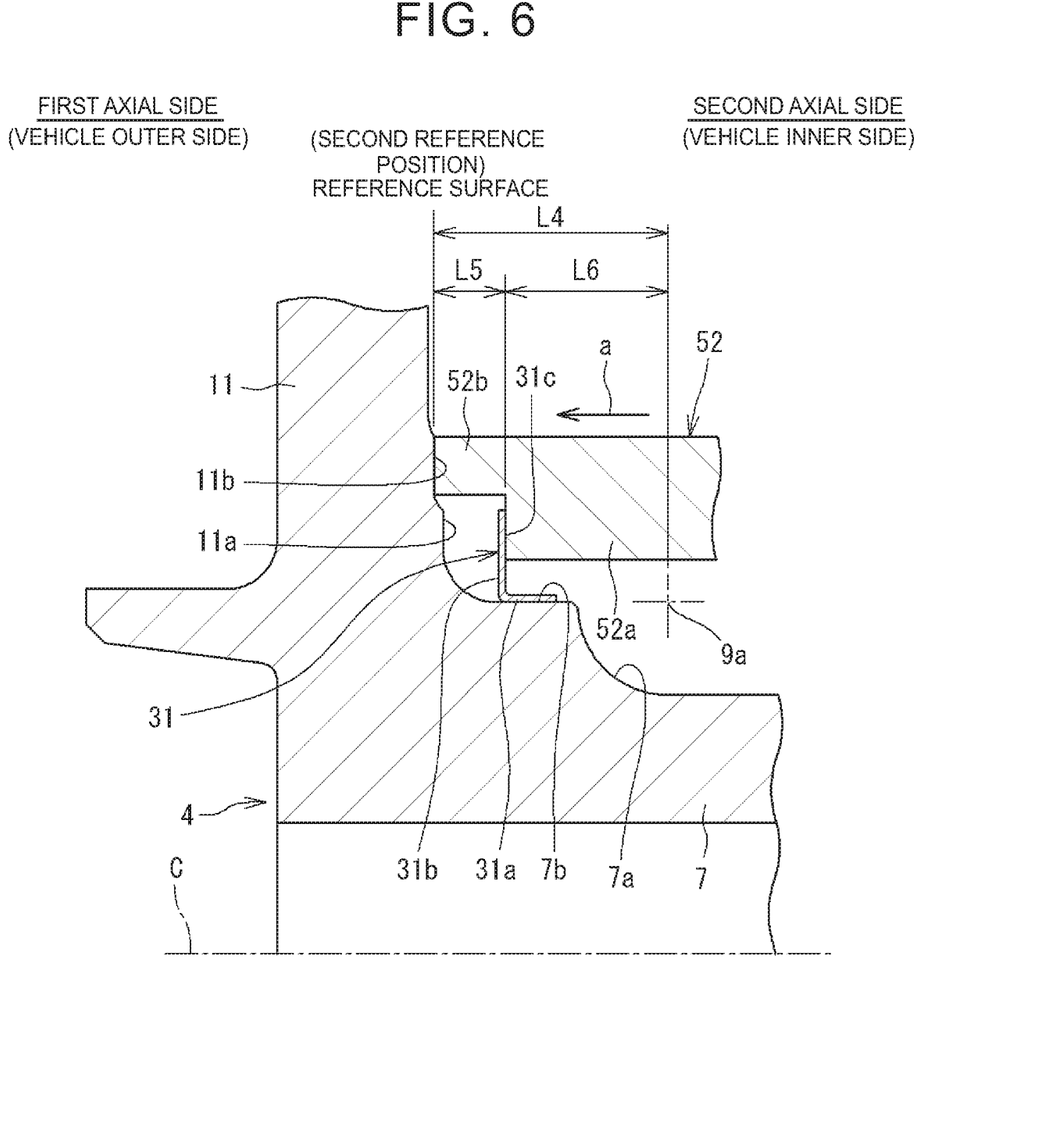
FIG. 6 is a sectional view illustrating a step of attaching a slinger to the inner shaft member.

A step of attaching the slinger 31 will be described. FIG. 6 is a sectional view illustrating a step of attaching the slinger 31 to the inner shaft member 4. As illustrated in FIG. 6, the slinger 31 is press-fitted on the outer peripheral surface 7b of the body portion 7 of the inner shaft member 4 using a press fitting jig (second press fitting jig) 52. The press fitting jig 52 is movable in the axial direction by a drive mechanism (not illustrated). The press fitting jig 52 includes a pressing portion 52a and a positioning portion 52b. The pressing portion 52a contacts the side surface 31c of the circular ring portion 31b of the slinger 31 on the second axial side. The positioning portion 52b is disposed on the outer side, in the radial direction, of the pressing portion 52a, and projects toward the first axial side with respect to the pressing portion 52a. The distance between an end surface of the pressing portion 52a on the first axial side and an end surface of the positioning portion 52b on the first axial side coincides with a design dimension L5 between the side surface 11b of the flange portion 11 on the second axial side, which serves as the reference surface, and the side surface (lip contact surface) 31c of the circular ring portion 31b of the slinger 31 on the second axial side.

The cylindrical portion 31a of the slinger 31 is press-fitted with the outer peripheral surface 7b of the body portion 7 using the press fitting jig 52. In this event, the circular ring portion 31b of the slinger 31 which is positioned at an end portion of the outer peripheral surface 7b of the body portion 7 on the second axial side is pressed in the direction of the arrow a by the pressing portion 52a. An end surface of the positioning portion 52b on the first axial side is caused to contact the reference surface 11b. Consequently, the slinger 31 is attached at an appropriate position in the axial direction.

As discussed earlier, the distance L4 from the reference surface 11b to the center 9a of the ball 9 on the inside raceway 7a is a predetermined dimension achieved by finishing using the grindstone 39 illustrated in FIG. 4. Therefore, a distance L6 between the lip contact surface 31c of the slinger 31 and the center 9a of the ball 9 is also a predetermined dimension.

As described above, the seal 30 which is attached to the outer ring member 3 and the center 9a of the ball 9 which is disposed on the outside raceway 3b are positioned in a predetermined relationship in the axial direction. The lip contact surface 31c of the slinger 31 and the center 9a of the ball 9 which is disposed on the inside raceway 7a of the inner shaft member 4 are positioned in a predetermined relationship in the axial direction. Therefore, the seal 30 and the lip contact surface 31c are also positioned in a predetermined relationship in the axial direction, and the axial lip 34a of the seal 30 can be caused to contact the lip contact surface 31c with an appropriate interference.

Only either the method of processing the outside raceway 3b and the method of attaching the seal 30 or the method of processing the inside raceway 7a and the method of attaching the slinger 31 may be performed as described above. Even in this case, the axial lip 34a can be caused to contact the lip contact surface 31c with an appropriate interference compared to a case where the method described above is not adopted for either of the outer ring member 3 and the inner shaft member 4.

In the embodiment described above, the reference surface (first reference position) as the reference for the position, in the axial direction, of the seal 30 is constituted by the end surface 3c of the outer ring member 3 on the first axial side. Consequently, the distance between the reference surface 3c and the seal 30 can be short, and the seal 30 can be attached easily using the reference surface 3c as the reference.

In the embodiment described above, the reference surface (second reference position) as the reference for the position, in the axial direction, of the lip contact surface 31c of the slinger 31 is constituted by the side surface 11b of the flange portion 11 on the second axial side. Consequently, the distance between the reference surface 11b and the slinger 31 can be short, and the slinger 31 can be attached easily using the reference surface 11b as the reference.

In the embodiment described above, the lip contact surface 31c is provided to the slinger 31, and the slinger 31 is provided with a spacing on the second axial side from the reference surface 11b of the flange portion 11. Therefore, it is difficult to position the slinger 31 in the axial direction compared to a case where the slinger 31 is caused to abut against the side surface 11a of the flange portion 11 on the second axial side, for example. However, the slinger 31 can be provided at an appropriate position with respect to the seal 30 by positioning the slinger 31 at a position a predetermined distance away using the reference surface 11b as the reference.

The present disclosure is not limited to the embodiment described above, and design changes may be made, as appropriate, without departing from the scope and spirit of the disclosure as defined in the claims. For example, in the embodiment described above, the slinger 31 is disposed with a spacing on the second axial side from the side surface 11a of the flange portion 11 on the second axial side. However, the slinger 31 may be caused to abut against the side surface 11a of the flange portion 11 on the second axial side.

In the embodiment described above, the axial lip 34a of the seal 30 contacts the lip contact surface 31c of the slinger 31. However, the slinger 31 may be omitted, and the axial lip 34a may be caused to contact the side surface 11a of the flange portion 11 on the second axial side which serves as a lip contact surface. In this case, the lip contact surface 11a is provided at a predetermined position, in the axial direction, with respect to the reference surface 11b. Also in this case, the lip contact surface 11a and the reference surface 11b may be the same surface to be disposed flush with each other.

In the embodiment described above, only the surface shape of the outside raceway 3b on the first axial side is processed with respect to the reference surface 3c. However, the surface shape of the outside raceway 3b on the second axial side may be processed using the same grindstone. The outside raceway 3b on the first axial side and the end surface 3c of the outer ring member 3 on the first axial side, which serves as a reference surface, may be processed using the same grindstone. Also in this case, the surface shape of the outside raceway 3b is processed with the distance, in the axial direction, from the end surface (reference surface) 3c managed, or in other words with the spacing in the axial direction from the reference surface 3c kept constant.

In the embodiment described above, the side surface 11b of the flange portion 11 on the second axial side, which serves as the reference surface, and the surface shape of the inside raceway 7a on the first axial side are processed at the same time. However, the surface shape of the inside raceway 7a may be processed without processing the reference surface 11b by moving the grindstone using the side surface 11b of the flange portion 11 on the second axial side as the reference surface (origin).

In the embodiment described above, the outside raceway 3b and the inside raceway 7a on the first axial side (vehicle outer side) are processed with the respective distances from the reference surfaces 3c and 11b managed. However, the outside raceway and the inside raceway are not limited to those on the first axial side (vehicle outer side) as long as the same rolling elements roll thereon. The rolling elements are not limited to balls, and may be rollers such as tapered rollers.

What is claimed is:

1. A manufacturing method of a wheel bearing device, the wheel bearing device including an outer ring member that has an outside raceway at an inner periphery, an inner shaft member that includes a shaft portion disposed inward of the outer ring member in a radial direction and having an inside raceway that faces the outside raceway, and a flange portion disposed closer to a first axial side than the outer ring member is, and that projects outward in the radial direction from the shaft portion, a plurality of rolling elements disposed between the outside raceway and the inside raceway, a seal provided at an end portion of the outer ring member on the first axial side, the seal including an axial lip and a hp contact surface provided on a side of the inner shaft member and contacted by the axial lip, the manufacturing method comprising:

processing the outside raceway at a first measured predetermined distance in an axial direction from a first reference position, the first reference position being set on the outer ring member; and providing the axial lip at a first measured predetermined position, in the axial direction, from the outer ring member with respect to the first reference position, wherein the first reference position is an end surface of the outer ring member on the first axial side;

providing the lip contact surface at a second measured predetermined position, in the axial direction from the inner shaft member with respect to a second reference position, wherein the second reference position is a side surface of the flange portion on a second axial side.

2. The manufacturing method of a wheel bearing device according to claim 1, further comprising:

processing the inside raceway at a second measured predetermined distance in the axial direction from the second reference position, the second reference position being set on the inner shaft member; and.

3. The manufacturing method of a wheel bearing device according to claim 2, wherein a slinger of the seal is provided on an outer peripheral surface of the shaft portion, and the lip contact surface is provided on a surface of the slinger on the second axial side.

* * * * *